Aug. 15, 1939.  W. DE VELLIER  2,169,408
DRIVE SPIKE
Filed July 28, 1936   2 Sheets-Sheet 1
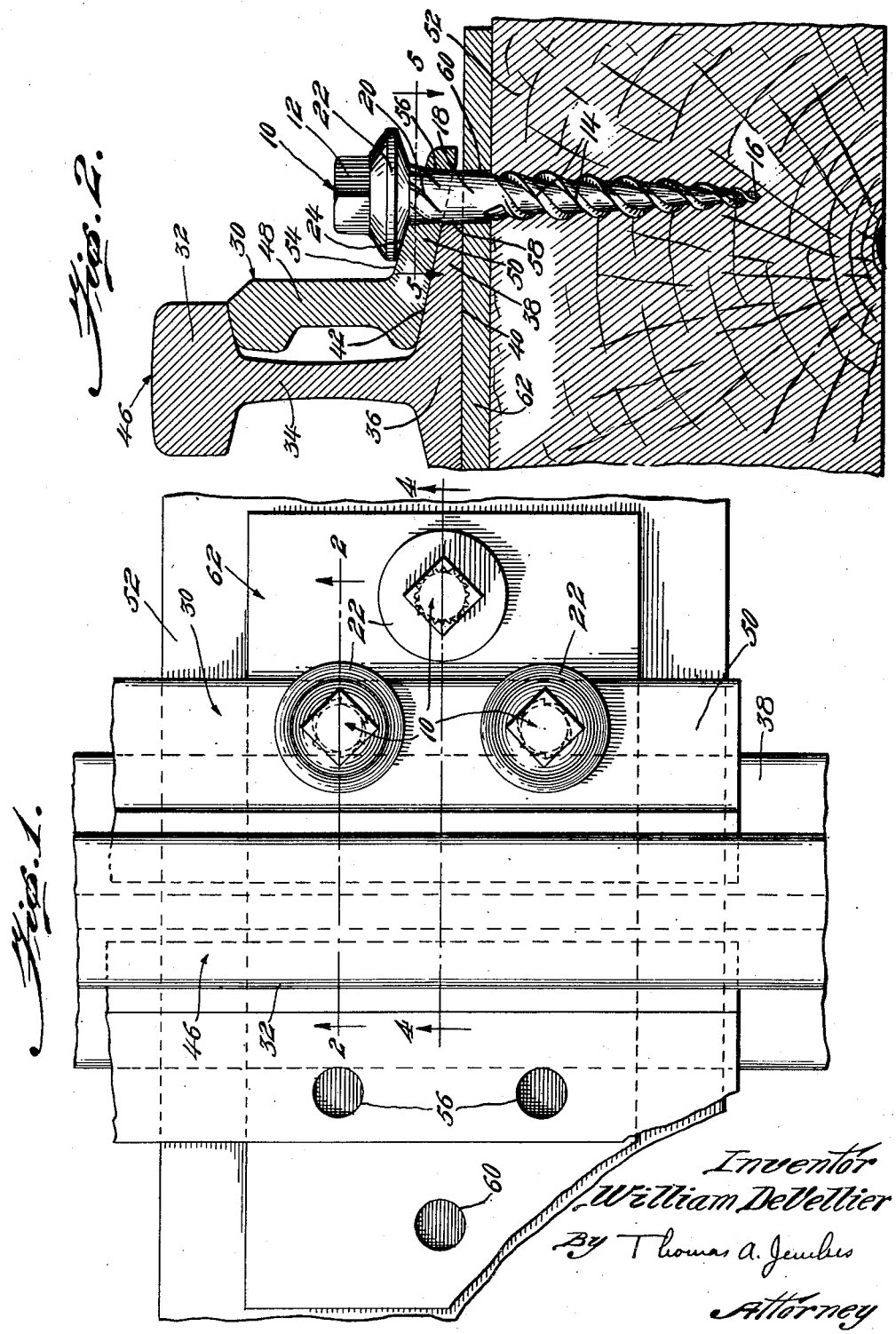

Aug. 15, 1939.    W. DE VELLIER    2,169,408
DRIVE SPIKE
Filed July 28, 1936    2 Sheets-Sheet 2
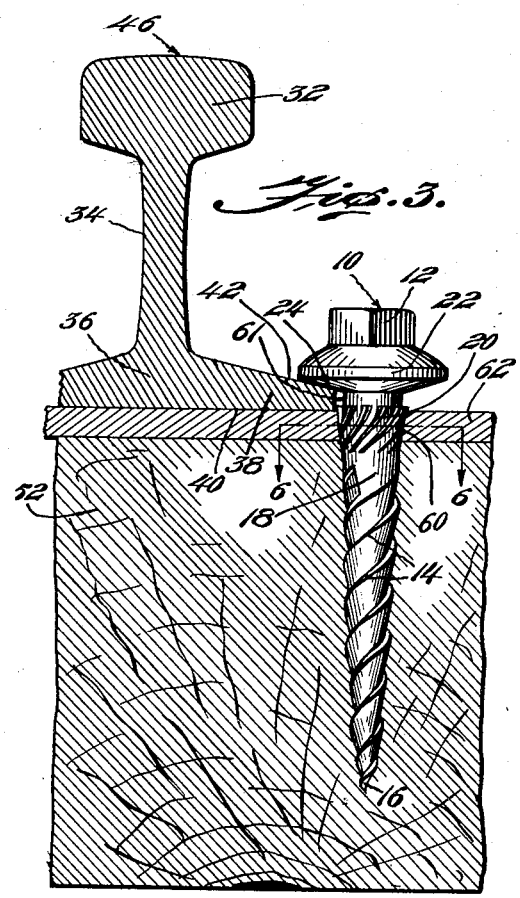
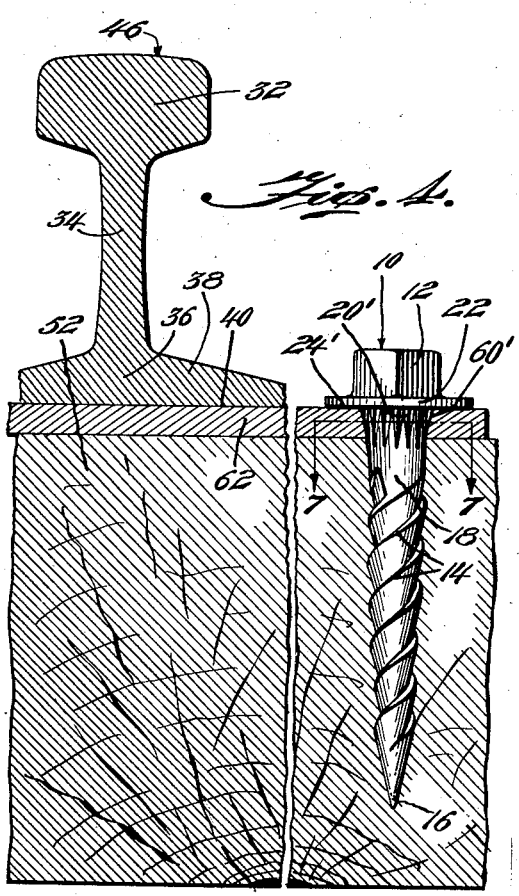
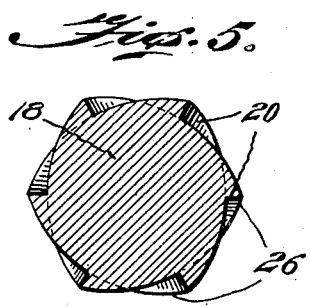
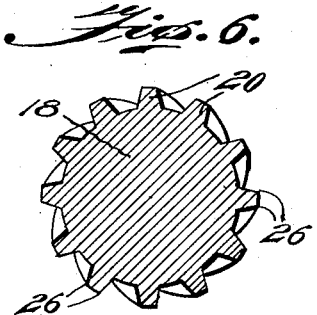
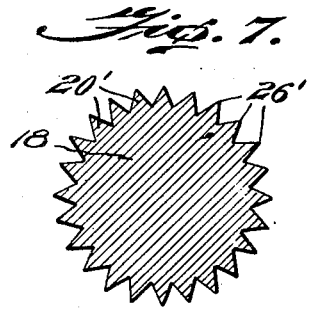
Inventor
William DeVellier
By Thomas A. Jenkins
Attorney Patented Aug. 15, 1939

2,169,408

UNITED STATES PATENT OFFICE 2,169,408

DRIVE SPIKE

William De Vellier, Newark, N. J.

Application July 28, 1936, Serial No. 93,019

1 Claim. (Cl. 85—44)

My invention relates to drive spikes and drive screws and particularly to the type of single point, preferably double thread drive screws of the type shown in Patents Nos. 1,651,796, 1,801,186 and 1,885,028 issued to John A. Arenz in which the threads of the screw terminate at the tip end in a single point.

My invention is particularly adapted for use in securing rail plates including fish plates or tie plates to rail ties or sleepers and so far as I am aware all former types of drive spikes or screws for this purpose have merely overlapped the rail flange or rail plate flange and penetrated the tie without being secured in any way to the rail plate.

An object of my invention is therefore, to provide supplemental means near the upper end of the shank of such drive spike or screw to rigidly engage the metal wall of the rail plate hole to tightly bond the drive spike or drive screw to the rail plate as well as to the tie, thereby to provide a tighter securement for the rail to the tie. It is obvious, however, that my improved spike or drive screw may be employed in securing any type of material or other plate to the surface of the object into which the shank of the drive spike or drive screw penetrates. I believe I am the first therefore to provide the novel combination of a rail tie, a rail plate overlying said tie in association with said rail and drivable spike means overlapping said rail plate and penetrating said tie and additionally rigidly secured itself to the rail plate. It is apparent that when my invention is applied with a drive screw of the Arenz type heretofore referred to that a type of drive screw is provided which may be quickly inserted by blows of a hammer and which will be rigidly imbedded in a tie and additionally rigidly secured to the rail plate.

These and such other objects of my invention as may hereinafter appear will be best understood from a description of the accompanying drawings which illustrate various embodiments thereof.

In the drawings, Fig. 1 is a plan view illustrating three drive screws constructed in accordance with my invention holding a rail tie plate and a rail fish plate to a tie.

Fig. 2 is a cross sectional view taken along the line 2—2 of Fig. 1.

Fig. 3 is a sectional view similar to Fig. 2 illustrating a different embodiment of drive screw constructed in accordance with my invention securing a tie plate and rail flange to a tie.

Fig. 4 is a sectional view taken along the line 4—4 of Fig. 1 with portions of the rail, tie, and tie plate being broken away, showing a different embodiment of drive screw constructed in accordance with my invention.

Fig. 5 is a cross sectional view taken through the shank of my improved drive screw along the line at 5—5 of Fig. 2.

Fig. 6 is a similar cross sectional view taken along the line 6—6 of Fig. 3 of the embodiment shown therein.

Fig. 7 is a similar cross sectional view taken along the line 7—7 of Fig. 4 of the embodiment shown therein.

In the drawings, wherein like characters of reference indicate like parts throughout, 10 generally indicates a drive spike or screw constructed in accordance with my invention. I have shown in the drawings three different embodiments of drive screws constructed in accordance with my invention; in Fig. 2, a drive screw constructed in accordance with the showing in Arenz Patent #1,651,796, but provided with the bolt head 12 shown in Arenz Patent #1,885,028; in Fig. 3, a drive screw having a single point and double thread constructed generally in accordance with Arenz Patent #1,801,186, but also provided with a bolt head 12; and in Fig. 4 a drive screw having a double thread 14 of the type shown in said Arenz Patent #1,801,186, but which terminates at a distance from its point 16 in accordance with a feature of the present invention.

A main feature of my invention, however, is to provide a drive spike 10 having a head 12 and a shank 18 and supplemental metal engaging means 20 projecting outwardly from the top portion of said shank. As stated hitherto, the shank 18 may have a flat or smooth outer surface to provide a drive spike, but is preferably provided with the threads 14 to provide a drive screw and preferably with the two or double threads 14 as shown and with a single shank point 16 in accordance with the disclosure in said Arenz patents with the holding power, ease and speed of drive and other advantages explained therein. Any suitable type of spike or screw head may be provided but in the embodiment shown the head 12 is preferably constructed of the bolt type with flat polygonal sides and with an annular flange 22 projecting outwardly from the lower end thereof. The flange 22 may be of any desired shape and may consist of the mushroom shape shown in Figs. 2 and 3 provided with the downwardly tapered lower surface 24 or it may as shown in Fig. 4 be provided with a flat surface 24', the particular shape of said lower surface depending on the use for which the drive spike or drive screw is intended.

As stated hitherto, a main feature of my invention comprises supplemental metal engaging means 20 projecting outwardly from the upper portion of the shank below said head flange 22 and above the upper end of the threaded portion 14. Said means may be of any desired shape to form a positive engagement with the wall of the metal hole through which the spike is driven and I have shown in Figs. 2-7 three different embodiments of such means. As shown in Figs. 2, 3, 5 and 6, I preferably employ threaded means 20 for this purpose preferably of substantially equal pitch to that of the wood engaging threads 14 and preferably arranged in helical formation around the periphery of the upper portion of the shank. In the embodiment shown in Figs. 2 and 5 I have shown six large threads terminating in the circumferentially spaced sharp material cutting outer edges 26 and in the embodiment of my invention shown in Figs. 3 and 6 I have shown a larger plurality of such similarly shaped helical material engaging threads 20 terminating in truncated conical ends also having on each side thereof the circumferentially spaced sharp metal cutting outer edges 26. Instead of arranging the metal engaging means in the form of helical or spiral threads or ribs I may as shown in Figs. 4 and 7 construct them in the form of vertically extending ribs 20' preferably tapered downwardly and inwardly as they extend downward of the shank and also terminating in circumferentially spaced sharp material cutting outer edges 26' in the form of true cones when viewed in section as shown in Fig. 7.

While my improved drive spike or drive screw 10 may be employed for securing any preferably metal object to another object, preferably one of softer material such as a metal plate to wood it has a large field of use in securing said plates to rail ties and I have illustrated in Figs. 1-4 the different embodiments of my invention shown therein applied for this purpose. I have shown in Figs. 1 and 2 my invention employed for use in more rigidly securing a fish plate 30 to a rail tie. A rail normally consists of an upper tread portion 32, an intermediate constricted web portion 34 and a base portion 36 terminating in outwardly projecting rail flanges 38 each having a flat lower surface 40 and a downwardly tapering upper surface 42. A fish plate 30 is employed to secure the abutting ends of adjacent rails 46 together and includes a vertically extending portion 48 provided with suitable bolt holes to receive bolts projecting through similarly aligned bolt holes in the rail webs 34 and lie adjacent the web surfaces of abutting rail ends. Each fish plate 30 is also provided with a base flange 50 adapted to also overlie the tie 52 and in the embodiment shown having a downwardly tapered upper surface 54 having a hole 56 therein adjacent the edge 58 of the rail flange 38. As shown in Fig. 2 the annular flange 22 of my improved drive screw shown is provided with a downwardly tapered lower surface 24 adapted to overlie the downwardly tapered upper surface 54 of the fish plate base flange 50 to rigidly secure the fish plate flange 50 to the tie 52, the shank 18 projecting downwardly through the hole 56 of said fish plate flange 50, through a cooperating hole 60 in the tie plate 62 which overlies the tie 52 and having the threaded portions thereof penetrating the tie 52 to a substantial depth. In accordance with my invention, the upper portion of the shank is provided with a supplemental means 20 of the type hitherto explained to cut into and rigidly engage the metal wall of the fish plate hole 56 to provide the novel combination of drivable spike means provided with supplemental means thereon to cut into and rigidly engage the metal wall of the rail plate hole to more rigidly secure the rail plate, in this embodiment the fish plate to the tie than has been hitherto possible. It will be noted that in the embodiment of drive screw shown in Fig. 2 said means 20 is immediately below the flange 22 to engage the wall of the hole 56 in the fish plate flange 50 which in this construction is located immediately below said spike head 12.

I have shown in Fig. 3 a slightly different embodiment of my invention differing in respects hitherto explained and provided with a different type of supplemental means 20 to rigidly engage the metal wall of the rail plate hole having the same generally helical type of threads as shown in Fig. 2 but comprising more threads. The drive screw shown in this embodiment is provided with a similar type of head to the drive screw shown in Fig. 2. As shown in Fig. 3, however, the fish plate 30 is omitted and my improved drive screw is so constructed to have the downwardly tapered lower surface 24 of the head flange 22 overlie the downwardly tapered upper surface 42 of the rail flange 38 and extend downwardly through the hole 60 in the tie plate 62. In this embodiment, however, as the lower surface 24 of the flange 22 must abut the upper surface 42 of the rail flange 38, the means 20 to rigidly cut into and engage the metal wall of the tie plate hole 60 is spaced a slight amount from said head 12 as shown at 61.

I have shown in Fig. 4 my improved drive screw constructed with a head flange 22 having the flat lower surface 24' to abut the flat upper surface of the tie plate 62 exterior of the rail flange 38, a shank 18 projecting downwardly through a hole 60' in said tie plate 62 and with the means 20' located immediately adjacent the head 12 to rigidly engage the metal wall of the tie plate hole 60'.

It is thus apparent that by variations in the head 12 of my improved drivable spike means 10 and in the location of the metal engaging means 20 on the upper portion of said shank relative to the head my improved drive spike may be constructed to function in association with different types of rail plates whether they be fish plates as shown in Fig. 2, or tie plates as shown in Figs. 3 and 4 of any type to more tightly bind said rail plate to the tie than formerly thought possible. As stated hitherto, however, it is obvious that my improved drive spike may be employed for securing any type of a preferably metal or other preferably flat object to a base preferably of softer material and provided with means to supplementally bite into the wall of the article hole, with the attendant advantages explained above.

It is understood that my invention is not limited to the specific embodiments shown and that various deviations may be made therefrom without departing from the spirit and scope of the appended claim.

What I claim is:

A drive screw for attaching a metal apertured member to a wooden member, comprising a head having an annular flange and a shank tapering to a point and having a wood screw threaded lower portion extending upwardly a substantial distance from said point and supplemental metal penetrating and engaging threaded means adapted to cut into the wall of said aperture above and spaced from said wood screw threaded portion, the threads in both of said threaded portions being inclined in the same direction, and substantially parallel and of high pitch.

WILLIAM DE VELLIER.